June 15, 1971  C. H. F. MORRIS, JR  3,585,113
PROCESS FOR FABRICATING REPLICATING MASTERS
Filed Sept. 29, 1969
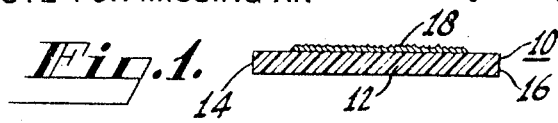
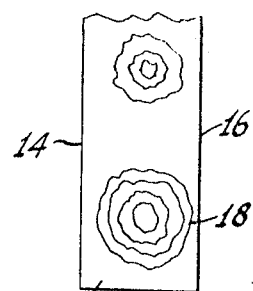
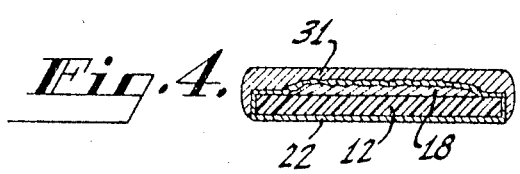
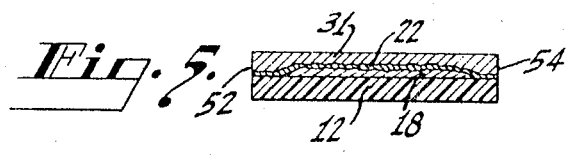
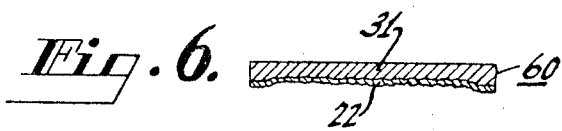
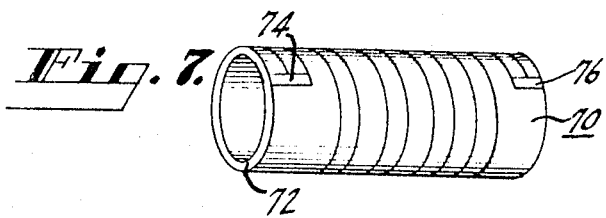
INVENTOR.
CHARLES H. F. MORRIS, JR.
BY
Attorney

United States Patent Office 3,585,113
Patented June 15, 1971

3,585,113
PROCESS FOR FABRICATING REPLICATING MASTERS
Charles Harry Fletcher Morris, Jr., Allentown, N.J., assignor to RCA Corporation
Filed Sept. 29, 1969, Ser. No. 861,629
Int. Cl. B51c 3/08; C26b 7/00; B29c 17/08
U.S. Cl. 204—6
7 Claims

ABSTRACT OF THE DISCLOSURE

The method for making a metal master having a phase hologram relief pattern in a surface thereof includes the steps of electrolessly plating the uniform thin metal coat over the surface of a tape having a hologram relief pattern on a first surface thereof and a smooth second surface, masking the second surface of the tape and then electroplating a metal coating onto the unmasked surfaces of the tape. Thereafter, the electroplated metal coating which lies over the first surface of the tape is masked and then the metal coatings which formed around the edges of the tape are removed. The remaining metal coating is then separated from the tape so as to provide a metal master.

BACKGROUND OF THE INVENTION

This invention relates to a process of fabricating metal masters of recorded information from which replicas can be made, and more particularly, to the fabrication of metal masters in the form of a metal tape containing holographic information thereon.

A hologram is a recording in the form of an interference fringe pattern of all the information in a wave front of light obtained from an object which is illuminated with spatially monochromatic light.

Normally, a hologram is recorded on silver emulsion photographic plates, the pattern of interference fringes thereof being manifested by variations in the opacity of the developed plate. However, the thickness of the emulsion of the developed photographic plate is a linear function of opacity of the emulsion. Thus, the pattern of interference is also manifested by a relief pattern with respect to the ground plane of the emulsion surface which is made up of a plurality of profile contours, the relative position and the relative magnitude of which comprise the holographic information. Such a relief pattern may be employed independently of any difference in opacity of the photographic plate in the reconstruction of the holographic information. Holograms employing this technique are termed phase holograms.

The profile contours of the relief pattern of the phase hologram typically have peaked-to-valley depths in the order of 500 A. and the resolution between contours are in the order of 1 micron.

A phase hologram may be prepared by exposing a photoresist, which may be coated on a plastic base, to the interference fringe pattern obtained by illumiating a photographic image or the object to be recorded in the form of a hologram with monochromatic spatially coherent light. The exposed photoresist is then processed by techniques well known in the art so as to leave a phase hologram pattern in the photoresist. Phase holograms as made directly from the object or from an image such as photographic film are termed original holograms. Metal hologram masters may be prepared from the original phase hologram by electroless plating and electroplating techniques. The advantage of preparing hologram metal masters is that many replicas can be made from a single metal hologram master due to the dimensional stability of such a master. Replication from the master can be accomplished for example by embossing the holographic relief pattern on the master onto a thermoplastic material.

A principal benefit of phase holograms is that they may be utilized to mass produce inexpensive replicas which can be played back, for example, through a television receiver. Consequently, such phase hologram replicas provide an inexpensive recording media for use in fields such as the entertainment, educational and data storage fields.

In the production of phase hologram replicas in the form of tape it has been found that if the thermoplastic replicating material is not guided properly in the replicating apparatus the tape may be caused to skew and the holographic image being empossed therein will likewise be caused to skew or rotate with respect to the axis of the tape. Where Frauenhoffer type phase holograms are employed, rotation of the hologram causes rotation of the image produced therefrom upon play-back. Such image rotations are undesirable when viewing the information played back from the hologram replica. Although the effect of rotation when viewing black and white information is relatively small, the rotational effect is extremely detrimental to the play-back of color information and the color can be almost completely washed out.

I have discovered that a prime cause of skewing of the thermoplastic replica tape in the replicating apparatus is a result of imperfections or edge distortion along the edges of the metal master tape from which the thermoplastic replica is made. In addition, the imperfections or edged distortions in the master tape result in some difficulty in obtaining accurate reliable separation of the thermoplastic replica from the master tape after embossing the phase hologram in the replica. Such poor separation can lead to additional problems such as tearing, scratching or deformation of the relief pattern which will manifest itself by a poor quality image upon play-back of the holographic replica.

SUMMARY OF THE INVENTION

A method for making a metal master having a relief pattern in a major surface thereof includes the steps of forming a metallic coating over the surface of an original body having a relief pattern therein so as to cause said relief pattern to be reproduced by the surface of the metal coating in contact with the original, and then removing any metal from the edge surfaces of the original. Thereafter, the metal coating is separated from the original to form the metal master.

BRIEF DESCRIPTION OF THE DRAWINGS

FIG. 1 is an end cross-sectional view of an original tape having a holographic relief pattern on one surface thereof.

FIG. 2 is a top elevational view of the original tape of FIG. 1.

FIG. 3 is an end cross-sectional view of the tape shown in FIG. 1 having a thin electrolessly plated metal coating thereon.

FIG. 4 is an end cross-sectional view of the tape shown in FIG. 3 having a relatively thick electroplated coating thereon.

FIG. 5 is an end cross sectional view of the tape shown in FIG. 4 after processing to conform the edges of the metal coatings to the edges of the original.

FIG. 6 is an end cross sectional view of the metal master obtained after separation from the original.

FIG. 7 is an isometric view of a drum useful in electroplating and etching of the hologram original.

DESCRIPTION OF THE PREFERRED EMBODIMENTS

FIGS. 1 and 2 are views of an original tape 10 having a holographic relief pattern thereon. Such a tape is hereinafter termed Holotape. The original Holotape 10 consists of a plastic base material 12 such as polymethylmethacrylate having straight edges 14 and 16 and a photoresist coating 18 on a surface thereof. The photoresist coating 18 is in the form of a relief pattern representative of a holographic image. The entire surface of the original Holotape 10 is plated with a very thin electrolessly deposited metal coating 22 thereon as shown in FIG. 3. The electroless metal coating 22 is generally in the order of 500 to 1000 A. in thickness, but may be more or less. The coating 22 conforms to the photoresist relief pattern 12 of the original Holotape 10.

The electrolessly plated Holotape is further processed by electroplating a metallic coating 31 over the electrolessly plated coating 22 in contact with the relief pattern 12. During this step, electroplated metal also forms around the edge surfaces 14 and 16 of the original Holotape 10. The electroplated metallic coating which is shown in FIG. 4, is generally in the order of 1 to 5 mils in thickness.

Subsequent to the step of electroplating the metal coating over the electrolessly deposited metallic layer 22 on the Holotape 10, the excess and undesirable portion of the metallic coatings 22 and 31 which form around the edges 14 and 16 of the Holotape 10 are removed. As can be seen with respect to FIG. 5, both the electrolessly plated metal and the electroplated metal are removed from the back surface and the edges 14 and 16 of the original Holotape so that the metallic layers remain only on the surface of the original Holotape which has the relief pattern thereon. Preferably, the metal is removed by etching. Also, the edges 52 and 54 of the etched plated coating substantially conforms to the straight edges 14 and 16 of the original Holotape 10.

The original Holotape 10 is now separated from the metallic layers which becomes a metal master 60. The separated metal master can be seen in FIG. 6.

Although it is preferred to form the metal coating by plating techniques as described above, it is also possible to form the coating by other techniques such as vapor deposition and vacuum evaporation.

EXAMPLE I

An original hologram is prepared for electroless plating by first cleaning the surface of the hologram by rinsing it in a detergent solution such as a solution of Liquinox, sold by Alconox, Inc. of New York, N.Y., followed by rinsing the original Holotape in deionized water. The clean surface is then sensitized by dipping it into a sensitizing solution containing 40 milliliters of concentrated ammonium hydroxide and 75 milliliters of a solution consisting of 1 gram of stannous chloride dihydrate per milliliter of concentrated hydrochloride acid in 690 milliliters of deionized water. The pH of this solution is adjusted to betwen about 1.0 and 1.1 with hydrochloric acid as necessary. Sensitization generally takes place within 1 to 5 minutes.

After sensitization, the surface is rinsed with deionized water and then treated with an activating solution which catalyzes the subsequent deposition of the electrolessly plated metal. A typical activating solution is an aqueous solution containing 1 gram per liter of palladium chloride and 1 milliliter per liter of concentrated hydrochloric acid. This solution deposits palladium nucleii on the sensitized surface. The catalyzed Holotape is then rinsed in deionized water and thereafter dipped in an electroless plating bath. A preferred aqueous electroless bath which is operable at room temperature and deposits a nickel boron layer has the following composition: $NiSO_4 \cdot 6H_2O$, 8.3 grams per liter; $Na_4P_2O_7 \cdot 10H_2O$, 17 grams per liter, and $(CH_3)NHBH_3$, 0.5 gram per liter. Concentrated ammonium hydroxide is added to adjust the bath to an initial pH of about 10.3. This bath produces a uniform, adherent, electrically conductive deposit of nickel having minimal stress in about 10 minutes of plating. The electrolessly plated Holotape is then removed from the electroless plating bath and rinsed with deionized water.

The Holotape is prepared for electroplating by masking the back surface, that is, the surface without the relief pattern thereon. Masking may be accomplished in any of several ways. For example, the back surface can be masked with a lacquer coating or an adhesive tape. Preferably, the Holotape is masked by winding it around a drum 70 having a resilient surface 72, such as rubber, in a manner as shown in FIG. 7. Here, the back surface of the tape is in contact with the resilient surface of the drum thereby preventing electroplating on that surface. The drum 70 is equipped with electrodes 74 and 76 for contacting the electrolessly deposited metal coating on the Holotape.

The Holotape on the drum is then placed in a nickel sulfamate electroplating bath such as a commercially available sulfamate bath marketed under the name of Sulfamex by the Meeker Company.

Typically, electroplating is accomplished with the aforementioned bath at a temperature of 110° F. and a current of 15 amperes until a 3 mil coating is formed.

After electroplating, the Holotape is removed from the plating drum and placed upon a similar drum. However, this time the relief pattern side of the plated Holotape is in contact with the drum surface. The Holotape on this second drum is then placed in a ferric chloride etching solution wherein the metal coating is removed from the back and sides of the Holotape. The surface having the relief pattern is protected by the rubber surface of the drum.

A typical etching solution is a commercially available solution marketed as RCE Etch Solution by the Philip A. Hunt Company. This solution, which has a specific gravity of about 38 to 42° Baumé, takes from about 4 to 15 minutes to etch the excess metal depending upon the temperature and the size of the tape. Typical operating temperatures are from room temperature to 125° F. Etching is stopped when the edges of the metal coating substantially conforms with the straight edges of the Holotape original.

After removal from the etching solution the Holotape is rinsed with water and the metal coating is separated by hand from the Holotape original to form a metal master.

It is preferred to remove the excess metal plating from the edges of the tape by a ferric chloride etch. However, any other means of removing the excess plating from the edges of the Holotape original so as to eliminate overlap of the metal plating onto the edges of the Holotape original and provide a substantially straight-edged metal master is within the scope of the invention. For example, other etchants may be used or the plated tape can be made the anode of a plating bath so as to remove the excess metal. Additionally, one may mechanically remove the metal, for example, by slicing the edges.

It should be further understood that the relief pattern reproduced from the original by the metal master is actually a negative of the original. However, in phase holography the same image is reproduced either from a positive or negative of the relief pattern.

What is claimed is:

1. A method for making a metal master having a holographic relief pattern in a surface thereof from an original hologram comprising the steps of
   (a) forming a metallic coating over the surface of said original hologram so as to cause the relief pattern of the original to be reproduced by the surface of the metal coating in contact with said relief pattern, (b) removing any metal from the edges of said original hologram, and (c) separating the metal coating from said original hologram to form a metal master.

2. The method for making a metal master as recited in claim 1 wherein the step of removing metal from the edges of the original hologram is done by chemical etching.

3. A method for making a metal master having a phase hologram relief pattern in a surface thereof comprising the steps of (a) electrolessly plating a uniform thin metal coating over the surface of a tape having a hologram relief pattern on a first surface thereof and a smooth second surface, (b) masking said second surface of said tape, (c) electroplating a metal coating onto the unmasked surfaces of said tape, (d) masking the electroplated metallic coating which lies over said first surface of the tape, (e) removing the metallic coatings which formed around the edges of said tape so as to conform the edge of the metallic coatings with the edge of said tape, (f) separating the metallic coatings from said first surface so as to provide a metal master.

4. The method for making a metal hologram master as disclosed in claim 3 wherein the step of removing the metallic coatings is done by chemical etching of said coatings.

5. The method for making a metal hologram master as recited in claim 3 wherein the step of removing said metallic coatings is accomplished by etching said coatings with a ferric chloride solution.

6. The method for making metal hologram master as recited in claim 3 wherein said metallic coatings are nickel and wherein said coating is removed from the edges of said tape by etching with a ferric chloride solution.

7. The method for making a metal hologram master as recited in claim 3 wherein said tape is masked prior to electroplating and removing the metallic coating from the edges thereof by winding said tape around a drum having a resilient surface.

References Cited

UNITED STATES PATENTS

| 1,776,015 | 9/1930 | Villarejo | 204—6 |
| 1,793,483 | 2/1931 | Hewitt | 204—4 |
| 2,327,762 | 8/1943 | Bull | 204—4 |
| 2,441,747 | 5/1948 | Beshgetoor | 204—6 |

OTHER REFERENCES

Electroforming of Dies and Molds, M. Mattia Plating, January 1968, pp. 40–46.

Electroforming Difficult Shapes, Product Engineering, December 1948, vol. 19, No. 12, pp. 86–89.

JOHN H. MACK, Primary Examiner

T. TUFARIELLO, Assistant Examiner

U.S. Cl. X.R.

156—7; 204—4